United States Patent
Pierce et al.

(10) Patent No.: US 7,721,019 B2
(45) Date of Patent: May 18, 2010

(54) METHOD AND APPARATUS FOR PARTITIONING INDUSTRIAL CONTROL DATA

(75) Inventors: Scott A. Pierce, Concord Township, OH (US); Anthony J. Diblasio, Valley View, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 254 days.

(21) Appl. No.: 11/239,947

(22) Filed: Sep. 30, 2005

(65) Prior Publication Data

US 2007/0076264 A1 Apr. 5, 2007

(51) Int. Cl.
- *G06F 3/00* (2006.01)
- *G06F 13/00* (2006.01)
- *G06F 5/00* (2006.01)
- *G06F 9/00* (2006.01)
- *G06F 9/24* (2006.01)
- *G06F 15/177* (2006.01)
- *G05B 19/42* (2006.01)

(52) U.S. Cl. .............................. 710/30; 710/36; 710/31; 700/86; 713/1

(58) Field of Classification Search .................. 700/86; 710/30, 31; 713/1

See application file for complete search history.

(56) References Cited

U.S. PATENT DOCUMENTS

| | | | |
|---|---|---|---|
| 4,831,582 A * | 5/1989 | Miller et al. ............. | 707/104.1 |
| 5,099,449 A | 3/1992 | Dombrosky et al. | |
| 5,307,463 A * | 4/1994 | Hyatt et al. ..................... | 710/1 |
| 5,745,708 A * | 4/1998 | Weppler et al. ............. | 710/119 |
| 5,896,289 A * | 4/1999 | Struger .......................... | 700/9 |
| 5,950,006 A * | 9/1999 | Crater et al. ................. | 717/140 |
| 6,088,624 A * | 7/2000 | Khan et al. ................... | 700/86 |
| 6,167,464 A | 12/2000 | Kretschmann | |
| 2005/0237992 A1* | 10/2005 | Mishra et al. ............... | 370/349 |

OTHER PUBLICATIONS

Vandever, Kevin; IT Jungle; Midrange Programmer Cast Your Data Conversion Troubles Away; OS/400 Edition, vol. 2, No. 18, Sep. 11, 2003;.

Hasubek, Bodo, European Search Report, Nov. 17, 2009, European Patent Office, Munich, Germany.

Kernighan, et al., The C Programming Language, C Programming Language, Jan. 1, 1988, pp. 210-220, Prentice Hall, Englewood Cliffs, New Jersey, USA.

* cited by examiner

*Primary Examiner*—Alford W Kindred
*Assistant Examiner*—Farley J Abad
(74) *Attorney, Agent, or Firm*—Boyle Frederickson LLP; R. Scott Speroff; John M. Miller

(57) ABSTRACT

An industrial controller includes a processing unit and a memory. The industrial controller is operable to communicate using an optimized connection packet including I/O data from a plurality of I/O modules arranged as an unstructured data block. The processing unit is operable to operate on the I/O data within the optimized connection packet to control a process. The memory is operable to store a plurality of cast tags. Each cast tag is associated with one of the I/O modules and provides a logical reference to a subset of the unformatted data block including at least a portion of the I/O data for the associated I/O module.

18 Claims, 2 Drawing Sheets

METHOD AND APPARATUS FOR PARTITIONING INDUSTRIAL CONTROL DATA

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to automation control systems and, more particularly, to a method and apparatus for partitioning industrial control data.

Industrial controllers are special purpose computers used for controlling industrial processes or manufacturing equipment. Under the direction of a stored program, the industrial controller examines a series of inputs reflecting the status of the controlled process and changes outputs affecting the control of the process. The inputs and outputs may be binary (i.e., "on" or "off") or alternatively analog inputs and outputs taking on a continuous range of values may also be used. The binary inputs and outputs may be represented by single bits of data, the analog inputs and outputs may be represented by multiple bit data words.

The various components of an industrial controller are often spatially distributed about a factory or manufacturing facility to be interconnected by one or more communication networks. These communication networks are characterized by being highly reliable and by delivering data with a minimal and well defined delay, as is required for real-time control. A number of different communication networks are commonly used in the industrial controller art including but not limited to: CONTROLNET™, DEVICENET™, and ETHERNET/IP™ networks whose specifications are published and whose protocols are used broadly by a number of manufacturers and suppliers. These communication networks differ from one another in physical aspects, for example, the type of media (e.g., co-axial cable, twisted pair, light fiber, etc.); the protocols of its operation, (e.g., baud rate, number of channels, word transmission size, use of connected messaging, etc.) and how the data is formatted and how it is collected into standard messages.

A common component of the industrial control system is an input or output (I/O) module which accepts data for an industrial controller from the controlled process or machine, and provides data from the industrial controller to the controlled process or machine. I/O modules are typically remote from the industrial controller and connected via a communications network as described above.

The various I/O modules employed in an industrial control system may generate data at differing intervals and frequencies. If the controller were to interface with the I/O modules asynchronously as each generated its data, the control system would encounter difficulties in synchronizing its control actions, and network traffic may become cumbersome. For instance, a controller may not require data from a particular I/O module at the same frequency as the module generates data. If the I/O module were to send a transaction to the controller each time it updated its data, the controller would be required to process transactions for data it did not need for its current control decision.

To optimize network traffic, translate and proxy between differing network types, and generate a synchronous data transfer frame, a scanner may be used as a physical or logical intermediary between the I/O modules and the controller. The scanner may interface with the I/O modules to collect data at predetermined update intervals, consolidate the data into a single optimized connection packet, and transfer the optimized connection packet to the controller using a single transaction per update interval. Hence, the controller receives data at a controlled and predetermined interval, presumably when it needs the data for control decision purposes.

Upon generating the optimized connection packet, the scanner periodically sends the optimized connection packet to the controller. An optimized connection packet is a block of unstructured data representing the data collected from each of the I/O modules. The data from each module is concatenated in a predetermined order without formatting. The construct of the optimized connection packet is determined in advance. This predetermined construct is used by the controller application and the program development system (i.e., used to develop the controller application) when referencing data within the optimized connection packet. For example, if the output of a particular I/O module resides at bits N-K of the optimized connection packet, the program instructions in the controller application reference exactly these bits for use in the generation of a control decision.

In developing a control application, the application developer must know the mapping of the optimized connection packet. The fixed references to parts of the optimized connection packet are included in the program commands that make up the control application. If the mapping of the optimized connection packet changes, due to the addition or deletion of an I/O module, a change in the order of the I/O modules serviced by the scanner, etc., the fixed references must be updated in the control application so that the controller references the appropriate data.

The fixed reference structure imposed on the optimized connection packet results in various problems for the control application developer with respect to program maintenance and integrity. The documentation of the data used in the programmatic references may be nonexistent or inefficient. Hence, when program modifications are required, the task of updating the programmatic references may be arduous, inexact, and time consuming.

One technique for addressing the difficulties arising from the optimized connection packet involves copying the combined packet into individual locations. These individual locations may then be referenced more easily by the control program. However, the same configuration control issues exist for the translation between the optimized connection packet and the individual locations. This technique also requires program maintenance, introduces a copy delay, and may compromise data integrity.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

BRIEF SUMMARY OF THE INVENTION

One aspect of the present invention is seen in an industrial controller including a processing unit and a memory. The industrial controller is operable to communicate using an optimized connection packet including I/O data from a plurality of I/O modules arranged as an unstructured data block. The processing unit is operable to operate on the I/O data within the optimized connection packet to control a process. The memory is operable to store a plurality of cast tags. Each cast tag is associated with one of the I/O modules and provides a logical reference to a subset of the unformatted data block including at least a portion of the I/O data for the associated I/O module.

Another aspect of the present invention is seen in a method for referencing industrial control data. The method includes exchanging I/O data with a plurality of I/O modules. An optimized connection packet including the I/O data for each module arranged in an unformatted data block is generated. A plurality of cast tags is defined. Each cast tag is associated with one of the I/O modules and provides a logical reference to a subset of the unformatted data block including at least a portion of the I/O data for the associated I/O module.

Yet another aspect of the present invention is seen in an industrial control system including a plurality of I/O modules, a scanner, and an industrial controller. The I/O modules are operable to interface with a process to exchange I/O data with the process. The scanner is operable to exchange the I/O data with the I/O modules and communicate using an optimized connection packet including the I/O data for each module arranged in an unformatted data block. The industrial controller operable to exchange the optimized connection packet with the scanner and control the process using the I/O data included in optimized connection packet. The industrial controller is further operable to store a plurality of cast tags. Each cast tag is associated with one of the I/O modules and provides a logical reference to a subset of the unformatted data block including at least a portion of the I/O data for the associated I/O module.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
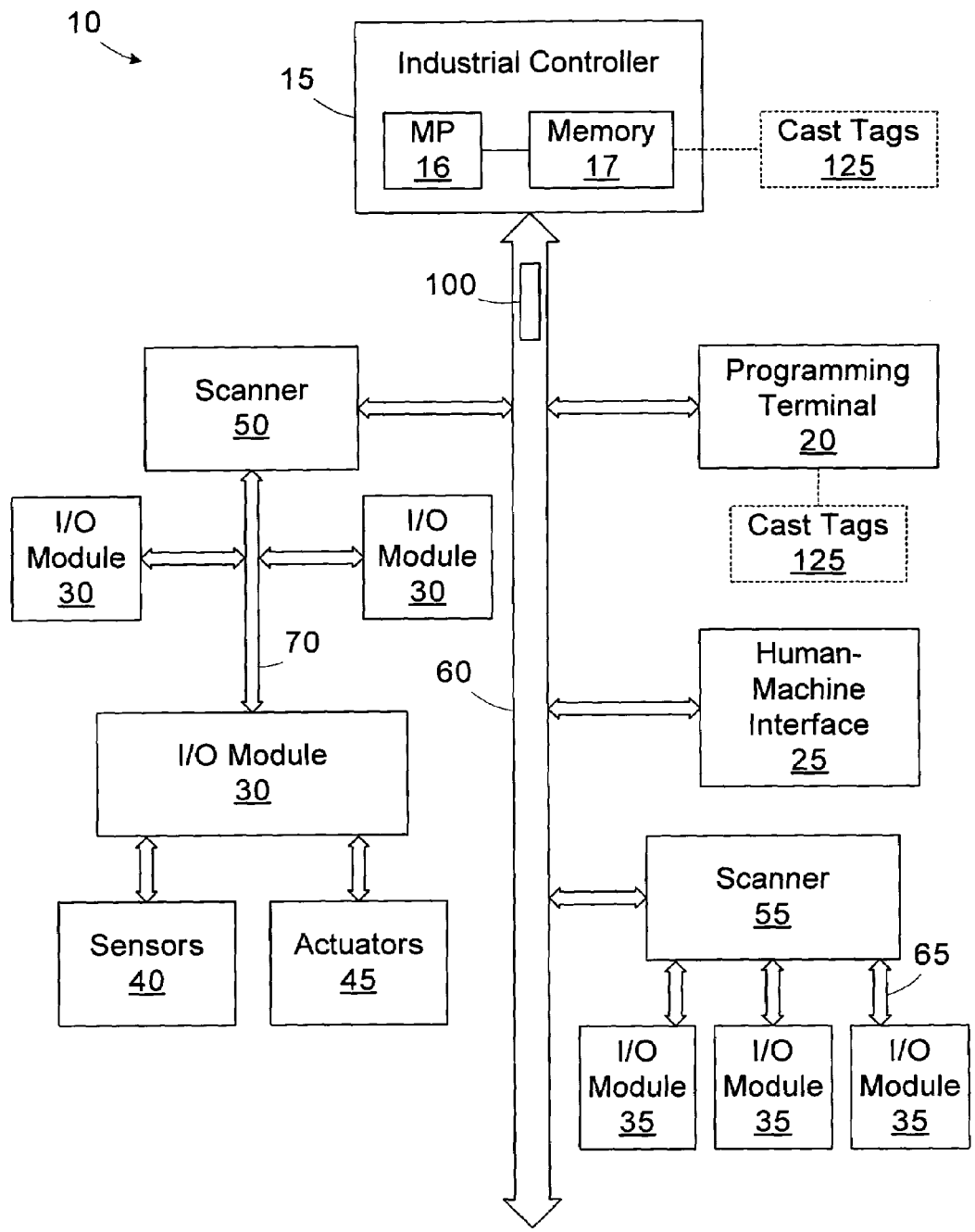
FIG. 1 is a simplified block diagram of an industrial control system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Referring now to the drawings wherein like reference numbers correspond to similar components throughout the several views and, specifically, referring to FIG. 1, the present invention shall be described in the context of an industrial control system 10. Generally, the industrial control system 10 includes an industrial controller 15 (e.g., programmable logic controller (PLC)) including a processing unit 16 and a memory 17, a programming terminal 20, a human-machine interface (HMI) 25, I/O modules 30, 35, sensors 40, actuators 45, scanners 50, 55, and communication media 60, 65, 70.

The programming terminal 20 allows the configuring, modifying, debugging and maintaining of the industrial control system 10. For instance, the programming terminal 20 may communicate with the industrial controller 15 to modify aspects of the controller's operation, such as the control program stored in the memory 17 and executed by the processing unit 16. The HMI 25 provides an operator interface for operating the industrial control system 10 to perform an automated industrial process.

As will be described in greater detail below, the programming terminal 20 defines cast tags that may be used to superimpose a data structure over the unstructured data sent between the industrial controller 15 and the scanners 50, 55. These cast tags may be employed by the other entities in the industrial control system 10, such as the industrial controller 15 or HMI 25, to logically reference individual subsets of the unstructured data block without requiring previous knowledge of the predetermined structure of the data. Hence, the cast tags may be used to logically reference the data objects maintained by the I/O modules that represent the configuration and state of the I/O module 30, even though those data objects are embedded in an unstructured data block that includes data from multiple modules.

The I/O modules 30, 35 provide interfaces to the sensors 40 and actuators 45 associated with a controlled process. The sensors 40 can sense items such as temperature, pressure, flow rate of a fluid, torque, electrical current, etc. The actuators 45 control items such as motors, valves, etc. associated with robotic systems, fans, beaters, pumps, and the like. For example, one type of actuator 45 is a motor drive operable to generate variable frequency drive signals for driving an associated motor. For ease of illustration, individual sensors 40 and actuators 45 are not illustrated for all of the I/O modules 30, 35.

At the industrial controller 15 the input signals from the I/O modules 30, 35, may be processed under a control program and further signals sent as output signals (i.e., to the actuators 45). The particular process being controlled, and specific input and output module types are not material to the present invention. The I/O modules 30, 35 may be integrated with the industrial controller 15 or remote from the industrial controller 15. In one embodiment, the industrial control system 10 may be implemented using LOGIX™ industrial controller components offered by Rockwell Automation, Inc. of Milwaukee, Wis.

The communication media 60, 65, 70 may take the form of cables, and may be discrete wiring, or may comprise a digital network which may also include repeaters, routers, bridges, and gateways. Suitable communication media 60, 65, 70 are the DEVICENET™, ETHERNET/IP™, OR CONTROL-NET™ networks also offered by Rockwell Automation.

As seen in FIG. 1, the I/O modules 30 are connected as a subnet 70 under the scanner 50. The scanner 50 acts as an intermediary between the I/O modules 30 and the industrial controller 15. The scanner 55 also connects to the communication medium 60, but its associated I/O modules 35 are coupled underneath the scanner 55 using separate channels 65 for communication with the scanner 55.

The scanners 50, 55 may also operate as routers to translate from one communication protocol (e.g., used on the communication medium 60) to another protocol (e.g., used over the channel 65 or subnet 70). The arrangement of the scanners 50, 55 is provided to illustrate different techniques for interfacing the I/O modules within the system 10. An actual implementation may include only a single scanner 50, 55 employing one of the interface arrangements shown or a different interface arrangement. For ease of illustration, the following discussion references the scanner 50, however, the techniques are equally applicable to either scanner 50, 55.

In the illustrated embodiment, the industrial controller 15 is programmed using an object-oriented programming language. The programming terminal 20 may interface with the industrial controller 15 to modify, add, or delete various objects stored in a memory 17 of the industrial controller 15 and used to implement its functionality. Collectively, the objects maintained in the memory to implement the functionality of the industrial controller 15 may be referred to as the control program of the industrial controller. Hence, the programming terminal 20 provides a programming interface for updating the control program of the industrial controller 15.

Figure 2:
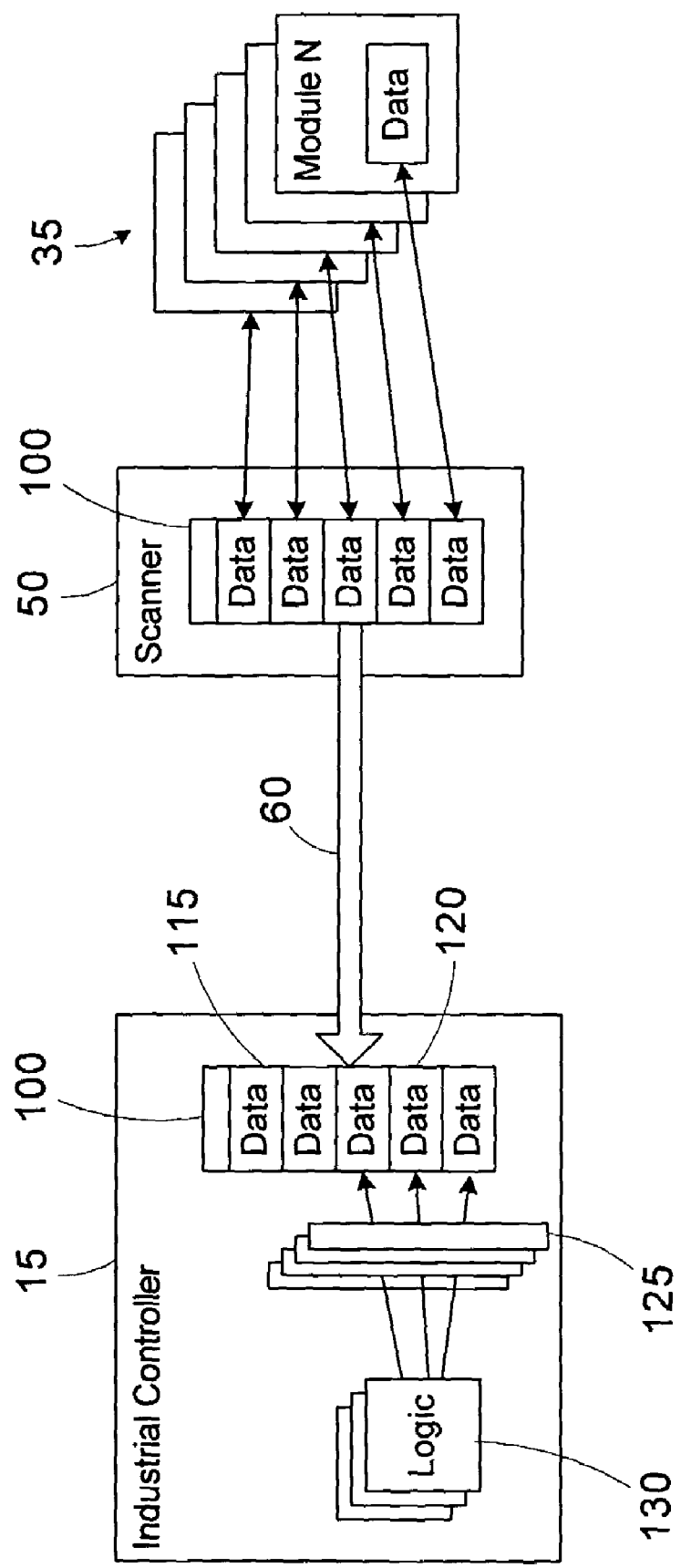
FIG. 2 is a diagram illustrating the interface between the industrial controller and the scanner for communicating an optimized connection packet.

The scanner 50 interfaces with the I/O modules 30 to collect input data during an update interval, consolidates the data into a single optimized connection packet 100, shown in greater detail in FIG. 2, and transfers the optimized connection packet 100 to the industrial controller 15. The particular interval between updates (i.e., optimized connection packets 100) may vary depending on the particular implementation. The scanner 50 also communicates output data from the industrial controller 15 to the I/O modules 30 to change the state of one of the controlled actuators 45 based on the control program's operations on the previous input data.

The scanner 50 may use various techniques for collecting the data from the I/O modules 30. For instance, the scanner 50 may poll the I/O modules 30 periodically and request the most recent data values for each monitored parameter. I/O modules 30 that had not generated new data would respond with their previous data values. Alternatively, an I/O module 30 may set a flag whenever it has generated new data. The scanner 50 may monitor the flag and request data during update intervals only when the flag is set (i.e., with the flag being cleared after the transfer). In yet another alternative technique, the I/O modules 30 may send data to the scanner 50 as it is generated (e.g., synchronously or asynchronously). Although this technique may result in additional traffic between the scanner 50 and the I/O modules 30, that traffic would not affect the industrial controller 15, as it would only receive optimized connection packets 100 at the expected interval. In the case of analog modules (e.g., one of the I/O modules 35), the data may be available continuously to the scanner 55.

Turning now to FIG. 2, a diagram illustrating the interface between the industrial controller 15 and the scanner 50 for communicating an optimized connection packet 100 is shown. The optimized connection packet 100 is a block of unstructured data representing the data collected from each of the I/O modules 35. The data from each I/O module 30 is concatenated in a predetermined order without formatting.

In one illustrative example, two of the I/O modules 35, referred to as Module1 and Module2, are associated with motor drives that in turn provide drive signals to motors. The motor drives exchange speed control data with the industrial controller 15 through the optimized connection packet 100. An exemplary data structure for the data elements of the speed control data is provided below in Tables 1 and 2. Table 1 provides format information for each of the speed control data elements, and Table 2 illustrates how data objects in the I/O module 30 are assembled into a data block for inclusion in the optimized connection packet 100. In the case of the scanner 55, the data objects (e.g., representing buffers in the I/O module) are concatenated by the scanner 55 into a single I/O data block for the I/O module 35.

The data objects of the I/O module 30 represent the configuration and state of the I/O module 30. The data blocks for all of the I/O modules 30, 35 are concatenated to form the optimized connection packet 100. The data structure and data block format are provided for illustrative purposes only, and the application of the present invention is not limited to any particular data structure or format.

TABLE 1

| Data Structure |
| --- |
| Separated Module Template |
| Struct SpeedControl |
|     BOOL AtSpeed |
|     BOOL RefFromNet |
|     BOOL ControlFromNet |
|     BOOL Ready |
|     BOOL Running Reverse |
|     BOOL RunningForward |
|     BOOL pad |
|     BOOL Faulted |
|     INT8 pad |
|     INT16 SpeedActualRPM |

TABLE 2

| Data Block Organization | | | | | | | | |
| --- | --- | --- | --- | --- | --- | --- | --- | --- |
| Byte | Bit 7 | Bit 6 | Bit 5 | Bit 4 | Bit 3 | Bit 2 | Bit 1 | Bit 0 |
| 0 | At Speed | Ref-From Net | Ctrl-From Net | Ready | Running Reverse | Running Forward | | Faulted |
| 1 | Pad Byte | | | | | | | |
| 2 | Speed Actual RPM (Low Byte) | | | | | | | |
| 3 | Speed Actual RPM (High Byte) | | | | | | | |

As seen in Table 1, the speed control data includes Boolean flags indicating whether the motor is running at the desired speed (AtSpeed); whether the torque reference is provided locally or over the network (RefFromNet); whether the motor drive is controlled locally or over the network (ControlFromNet); whether the motor drive is in a ready state (Ready); whether the motor is running in a reverse (Running Reverse) or forward (RunningForward) direction; and whether the motor drive is in a fault state (Faulted). One flag (pad) is reserved for future use. The speed control data also includes a reserved, 1 byte field (pad), one byte for the least significant bits of the motor speed (SpeedActualRPM), and one bye for the most significant bits of the motor speed. The speed control data for the two modules is simply concatenated within the optimized connection packet 100 resulting in a string of bits including the speed control data described above for each module. Hence, each data object for an I/O module is arbitrarily offset within the optimized connection packet 100, albeit in a predetermined manner.

Assuming the optimized connection packet 100 starts with the data for module 1 followed by data from other modules, and then by the data for module 2, bits 0 through 31 (i.e., block 115) represent the module 1 speed control data and bits 628 through 659 (i.e., block 120) represent the speed control data for module 2.

Although only one data block 115, 120 is shown for each I/O module 30, multiple data blocks may be used. For example, the output data, or configuration data for an I/O module 30 may be included in a separate block from the input data. Also, the input data may be separated into separate data blocks, each associated with one of the buffers on the I/O module 30.

The industrial control system 10 employs cast tags 125 that reference individual blocks 115, 120 within the optimized connection packet 100. Generally, a cast tag 125 provides a logical reference to a portion of the optimized connection packet 100 that includes the data objects for a particular I/O module 30. Logic 130 in the industrial controller 15 may use the cast tags 125 in lieu of a hard reference to the individual bits of the optimized connection packet 100.

In a typical industrial control environment, a tag may be used to reference a single data area. A tag typically includes a name or symbol, a data type that specifies member names and data format, and a data object that references a particular physical location of a data set. The data object for a conventional tag represents the entire data set, and typically only one tag references a particular data object.

A cast tag 125 differs from a conventional tag in that its data object only references a subset of the data set, and its data type is superimposed over the portion of the data set it references. Multiple cast tags 125 can reference different subsets of the data set for different I/O modules 30 and impose their own independent data types over that data. In the programming view, the tags appear to be independent. Hence, each cast tag 125 references the I/O data of one of the I/O modules 30, and the members defined by the cast tag 125 reference the individual data elements stored in the buffer(s) of the I/O module 30.

The structure represented in Table 1 above represents the data type used in the cast tag 125 for specifying the members and data formats for the data elements of the speed control data. Hence, in the cast tag 125 Module1.AtSpeed, Module1 is the symbol and AtSpeed is defined as one of the members of the data type with a Boolean format. The data object references Bit 7 of the optimized connection packet 100.

The following pseudocode examples provided below in Tables 3 and 4 illustrate how the programmatic references using a cast tag 125 differ from previous hard reference commands. The pseudocode is not intended to reflect the actual code that is used, but rather to conceptually illustrate the advantage provided by cast tags 125 over hard references.

TABLE 3

Pseudocode Using Cast Tags

If NOT( Module1.AtSpeed )
    Alert ( 17 );
While( Module2.SpeedActualRPM < 30000)

TABLE 4

Pseudocode Without Cast Tags

If NOT( Bit [7] of OCP )
    Alert ( 17 );
While( Bits [643..658] of OCP < 30000)

As is apparent in the example of table 3, the cast tags 125 allow reference to the parameters of the associated module 30 without requiring knowledge of the order used by the scanner 50 to concatenate data. Moreover, the data format is specified in the cast tag 125 and need not be included in the programmatic reference.

Returning to FIG. 1, the cast tags 125 are instantiated and maintained by the programming terminal 20 and may be used in the programming environment to generate the control program of the industrial controller 15. In the programming environment, the data for each module 30 appears to be independent, and each member can be referenced by name in the logic. The cast tags 125 are also stored on the industrial controller 15.

In some cases, the control program may be compiled prior to loading it on the industrial controller 15, and the references are translated into physical references in the compiled code. However, if the organization of the optimized connection packet 100 used by the scanner 50 changes (e.g., due to the addition or deletion of a module 30), only the cast tags 125 need to be updated. The control program may then be re-compiled and the new references specified by the cast tags 125 will be incorporated into the compiled code. Hence, no changes are required in the control program. In other cases, where the control program is interpreted, the cast tags 125 may be referenced directly in the control program.

Because the industrial controller 15 stores the cast tags 125, other entities in the industrial control system 10 may also use the logical references created by the cast tags 125 to reference module data stored by the industrial controller 15. For example, the HMI 25 may query the industrial controller 15 to determine if the motor associated with Module 1 is at speed using the Module1.AtSpeed reference. Moreover, the HMI 25 may include its own code operable to continually display the status of the motors associated with Modules 1 and 2 on its display. The HMI code need only use the Module1.AtSpeed and Module2.AtSpeed referents to access the status information. If the organization of the optimized connection packet 100 changes, the HMI 25 code does not need to be modified.

The cast tags 125 may also be used to reconstruct the control program. For example, if a programming terminal other than the programming terminal 20 shown in FIG. 1 (e.g., a field programming terminal implemented on a notebook computer) interfaces with the industrial controller 15, it may use the cast tags 125 to determine the construction of the optimized data packet 100 and also to analyze the control program code.

The use of cast tags 125 greatly simplifies the development and maintenance of code used in the industrial control system 10. Changes to the organization of the optimized connection packet 100 do not require code modifications, only updates to the cast tags 125. Moreover, once cast tags 125 are defined, users may interface with the industrial control system 10 with greater ease, as they do not need to access an external document that described the mapping of the optimized connection packet 100 to access module data in the industrial control system 10.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. An industrial control system, comprising:
   a plurality of I/O modules operable to interface with input devices and output devices on an industrial machine or process, the I/O modules communicating input I/O data representing the status of the input devices and output I/O data controlling the operation of the output devices;
   a scanner operable to exchange the I/O data with the I/O modules through a network, the scanner assembling the I/O data for a plurality of the I/O modules into a single optimized connection packet, wherein the I/O data for the plurality of I/O modules communicating with the scanner is arranged in a predetermined arrangement data block within the optimized connection packet, and wherein the I/O data is identified as to type and I/O module only by a relative location within the data block; and
   an industrial controller operable to exchange the optimized connection packet with the scanner, the industrial controller being further operable to store a control program including a plurality of cast tags, wherein each cast tag is referenced to a subset of the I/O data in the data block associated with a different single I/O module, and wherein each cast tag identifies a particular I/O module and includes a label for the data, a data type which is effective to characterize the I/O data for purposes of the executing the control program, and a reference to a location of the I/O data in the data block;
   wherein data for a particular I/O module may be accessed from the optimized connection packet by a programmatic reference of the cast tag at the industrial controller without communicating this information in the optimized connection packet.

2. The system of claim 1, wherein the cast tags includes a first cast tag referencing an input portion of the I/O data and a second cast tag referencing an output portion of the I/O data for a particular I/O module.

3. The system of claim 1, wherein the I/O data comprises at least one of input data and output data.

4. The system of claim 1, further comprising a programming terminal operable to generate the cast tags based on a predetermined arrangement of the I/O data in the data block.

5. The system of claim 1, further comprising an interface unit operable to interface with the industrial controller and employ the cast tags to reference data associated with one of the I/O modules.

6. The system of claim 5, wherein the interface unit comprises a human machine interface unit.

7. The system of claim 1, wherein the data type specifies member names and data formats for the I/O data associated with the I/O module.

8. The system of claim 1, wherein the I/O data for at least one of the I/O modules includes a plurality of data elements representing the configuration and state of the I/O module, and the data type includes a member name and a data format for each of the data elements.

9. The system of claim 1, wherein the scanner is connected through a first network to the industrial controller and wherein the scanner is connected through a second network the I/O modules.

10. The system of claim 1, wherein the scanner is operable to poll the I/O modules to collect at least a portion of the I/O data.

11. The system of claim 1, wherein the I/O modules are operable to send at least a portion of the I/O data to the scanner.

12. The system of claim 1, wherein the optimized connection packet comprises the I/O data associated with each of the modules concatenated in a predetermined order.

13. The industrial controller of claim 1, wherein the data type specifies member names and data formats for the I/O data associated with the I/O module.

14. The industrial controller of claim 1, wherein the I/O data for at least one of the I/O modules includes a plurality of data elements representing the configuration and state of the I/O module, and the data type includes a member name and a data format for each of the data elements.

15. An industrial controller operable to communicate using an optimized connection packet including all I/O data associated with all I/O modules associated with a single I/O network, wherein the I/O data is arranged as an unformatted concatenated data block, the industrial controller comprising:
   a processing unit operable to access the I/O data within the optimized connection packet to control a process through executing a stored control program; and
   a memory operable to store the control program including a plurality of cast tags, each cast tag being associated with I/O data for one of the I/O modules and providing a reference to a subset of the unformatted concatenated data block including at least a portion of the I/O data for the associated I/O module and imposing data types of the cast tag on the subset of the unformatted concatenated data block;
   wherein the cast tags are data objects in the object-oriented language accessible within the stored control program defining the subsets of data in the unformatted concatenated data block that are related to the respective I/O modules by identifying a relative location within the data block data for a particular I/O module, a label for the data and a data type of the data and wherein the cast tags provide access to the subsets of data for the control program;
   wherein data for a particular I/O module may be accessed from the optimized connection packet by a programmatic reference of the cast tag at the industrial controller without communicating this information in the optimized connection packet.

16. The industrial controller of claim 15, wherein the cast tags includes a first cast tag referencing an input portion of the I/O data and a second cast tag referencing an output portion of the I/O data for a particular I/O module.

17. The industrial controller of claim 15, wherein the I/O data comprises at least one of input data and output data.

18. The industrial controller of claim 15, wherein the optimized connection packet comprises the I/O data associated with each of the modules concatenated in a predetermined order.

* * * * *